(12) United States Patent
Crevasse et al.

(10) Patent No.: US 6,183,652 B1
(45) Date of Patent: Feb. 6, 2001

(54) METHOD FOR REMOVING MICROORGANISM CONTAMINATION FROM A POLISHING SLURRY

(75) Inventors: Annette Margaret Crevasse, Apopka; William Graham Easter, Orlando; John Albert Maze, Orlando; Frank Miceli, Orlando, all of FL (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/415,126

(22) Filed: Oct. 8, 1999

(51) Int. Cl.[7] .................................................. C02F 1/48
(52) U.S. Cl. ...................... 210/748; 210/758; 210/767; 438/692
(58) Field of Search ..................................... 210/748, 758, 210/763, 767; 438/633, 692

(56) References Cited

U.S. PATENT DOCUMENTS

| 5,174,877 | * | 12/1992 | Cooper | 204/193 |
| 5,462,674 | * | 10/1995 | Butters | 210/748 |
| 5,589,078 | * | 12/1996 | Butters et al. | 210/748 |
| 6,001,258 | * | 12/1999 | Sluys et al. | |
| 6,120,571 | * | 9/2000 | Aihara | |

* cited by examiner

Primary Examiner—Chester T. Barry
(74) Attorney, Agent, or Firm—Christie, Parker & Hale, LLP

(57) ABSTRACT

A method for removing microorganism contamination from a polishing slurry used for chemical mechanical polishing operations in the semiconductor manufacturing industry includes treating a slurry stream with ultraviolet (uv) energy to destroy the microorganisms, then filtering the uv-treated stream to remove the destroyed microorganisms before the slurry is delivered to the polishing apparatus.

19 Claims, 1 Drawing Sheet

METHOD FOR REMOVING MICROORGANISM CONTAMINATION FROM A POLISHING SLURRY

BACKGROUND OF THE INVENTION

The present invention relates most generally to polishing operations which use a polishing slurry, and more particularly to a method for removing microorganism contamination from a polishing slurry used in conjunction with a chemical mechanical polishing apparatus used for polishing in the semiconductor manufacturing industry.

Polishing operations which use polishing slurries find application in various technical fields. A commonly used polishing operation is a chemical mechanical polishing (CMP) operation used to polish substrates in the semiconductor manufacturing industry. CMP polishes a substrate surface by applying a force to mechanically urge the polishing surface against a rotating polishing pad, and also by providing a polishing slurry to the interface formed between the polishing pad and the surface being polished within the CMP apparatus. Slurries generally include both chemical and abrasive components. Slurries commonly used in the semiconductor manufacturing industry may include 20–30% solids and will include abrasives such as silica colloidal solids. The size of the abrasives may range from 50 nm–300 nm in diameter. Slurries also generally include chemical components. Generally speaking, slurries used for polishing metal films are acidic in nature, and slurries used for polishing oxide or other dielectric films are basic in nature. Slurries which are used for buffing, commonly used as a final step in the polishing operation, are generally neutral solutions having a pH within the range of 6 to 8.

Particularly in neutral pH slurries, microorganisms may be present, although some forms of microorganisms can survive and may be present in slurry solutions having a pH within the extreme basic or acidic range. Once present in a slurry solution, microorganisms can grow and multiply. Microorganisms tend to agglomerate and may chemically and physically contaminate the surface being polished, or the devices formed within the surface being polished. In their agglomerated state, microorganisms combine to form large particles, which can produce scratches and other defects on the surfaces of the semiconductor devices which are being polished. These scratches and other defects can destroy a very large number of integrated circuit devices being formed within the substrate. As the features of the integrated circuit devices being produced within the semiconductor substrates continue to shrink, the devices become increasingly more sensitive to scratches and other mechanically formed defects.

Slurry solutions having high concentrations of microorganism contamination, and especially those with agglomerated microorganism contaminants, also cause other problems such as clogging within the tubing and other components of the fluid delivery system used to deliver the slurry solution. As such, it is very desirable to remove microorganism contamination from polishing slurries.

One approach to removing microorganism contamination from slurries, is to add biocides to kill the microorganisms. However, this introduces another unknown species into the slurry which could degrade performance of the polishing operation. Biocides may include antibiotics and pesticides which contain chemicals which are harmful to the environment, harmful to the devices being polished, and which may be toxic to humans. As such, this approach is unsuitable for applications where the polishing operations are performed in close proximity to people who operate and service the polishing equipment. Furthermore, this approach is particularly unsuitable for operations such as the chemical mechanical polishing of semiconductor devices, where the devices being formed within the substrate being polished are very sensitive to foreign chemical species being introduced to the surface to be polished.

It can be seen that there is a need for a method for removing microorganism contamination from a polishing slurry without adding harmful additives to the slurry or otherwise adversely compromising the slurry integrity or quality or safety.

SUMMARY OF THE INVENTION

The present invention provides a method for removing microorganism contamination from a polishing slurry by uv-treating, then filtering the polishing slurry.

DETAILED DESCRIPTION OF THE INVENTION

Figure 1:
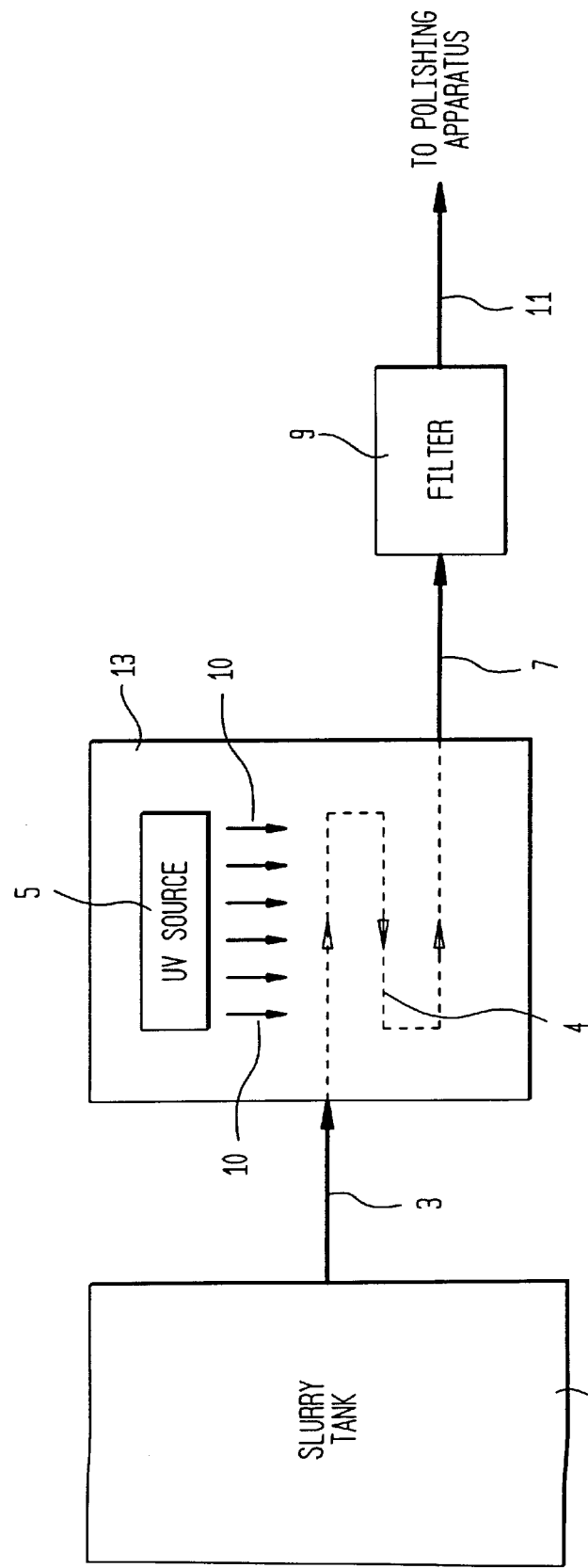
FIG. 1 is a flow diagram of the method used to remove microorganism contamination from a polishing slurry.

The present invention addresses the shortcomings of conventional approaches to reducing or eliminating microorganism contamination from a polishing slurry stream by providing a method which includes exposing a slurry stream to ultraviolet (uv) radiation, then filtering the slurry stream prior to delivering the stream to a polishing apparatus. The uv radiation provides energy which is used to treat the slurry stream and to destroy the microorganisms, adds nothing to the slurry stream, and does not generate any bi-products. The destroyed microorganisms are less prone to agglomerate and are subsequently filtered out of the stream before the slurry stream is delivered to the polishing apparatus.

The method of the present invention may be used to reduce or completely eliminate microorganism contamination from a slurry stream at any stage prior to the point of use of the slurry stream at the polishing apparatus, or during a recirculation process. As shown in FIG. 1, slurry stream 3 is withdrawn from slurry tank 1. Conventional means for storing a polishing slurry and for withdrawing and delivering a slurry stream may be used. For CMP operations commonly used in the semiconductor manufacturing industry, the large reservoir of slurry stored at the manufacturing facility may be referred to as a slurry "tote." The slurry tote, in turn, feeds the intermediate slurry "day tank" from which slurry is delivered to its point of use, the CMP apparatus. In another exemplary embodiment, slurry tank 1 may be a recirculating tank. These are understood to be exemplary only. Slurry stream 3 may be an acidic slurry, a basic slurry, or a neutral slurry having a pH in the range of 6–8, as is commonly used in a CMP buffing operation. It is understood that slurry stream 3 which is treated according to the method of the present invention, may also be a stream which has been delivered from a storage tank and then mixed with another component (not shown), such as water for dilution or an acid or base to adjust the pH of the stream. As such, it can be seen that the method of the present invention can be used to treat a slurry stream at any stage prior to point of use, or during a recirculation process. For example, the method of the present invention may be used to treat a slurry stream being delivered from a recirculating tank, a slurry tote, or slurry day tank, as above.

Still referring to FIG. 1, a uv source 5 is used to treat slurry stream 4 within treatment chamber 13. The uv treated slurry stream 7 is next delivered to filter 9 where it is filtered. The filtered slurry stream 11 is then delivered to a polishing apparatus or a further storage unit.

UV energy is found in the electromagnetic spectrum between visible light and x-rays and can be described as invisible radiation. UV energy, represented by arrows 10, is transmitted to slurry stream 4 as it flows through uv system treatment chamber 13. Conventional systems for the uv treatment of solutions may be used. In an exemplary embodiment, a low pressure mercury discharge lamp may be used as uv source 5 to provide ultraviolet (uv) energy 10 to the slurry stream 4 being treated. Also in an exemplary embodiment, treatment chamber 13 may include a hydraulic management system consisting of an inlet-outlet connection design and baffles (not shown) mounted within the treatment chamber 13, which together combine to create turbulence, increase residence time, and insure complete exposure of the slurry stream to uv energy 10. In other exemplary embodiments, other configurations for treating a slurry stream with uv energy, may be used. In an exemplary embodiment, the uv energy 10 used to treat the slurry solution may include uv radiation having a wavelength of 185 nm, but other wavelengths such as 254 mn may be used. The residence time of slurry stream 4 within treatment chamber 13 is chosen to insure that the solution is sufficiently treated.

UV energy treats the slurry solution in the following manner. All living organisms contain DNA (deoxyribonucleic acid). DNA provides the mechanism for all functions needed to sustain life. UV energy having the proper wavelength, penetrates the outer cell membrane of microorganisms, passes through the cell body, reaches the DNA, and alters the genetic material. The microorganism is thereby destroyed in a non-chemical manner and is unable to reproduce and less likely to agglomerate.

The dosage of the uv energy is chosen to deliver a sufficient amount of uv energy necessary to destroy the population of microorganisms within the slurry stream. In an exemplary embodiment, a dosage level exceeding 10,000 $\mu$W-s/cm$^2$ (micro watt-seconds per square centimeter) may be used. In other exemplary embodiments, different dosage levels may be used. Any suitable combination of processing parameters such as flow rate, wavelength of uv energy, residence time within the treatment chamber, dosage, and physical details of the treatment chamber may be used in combination to ensure that the microorganism population within the slurry stream is largely or completely destroyed.

The uv-treated slurry stream 7 is next filtered. Filter 9 may be any appropriate filter used to filter slurry streams as common in the semiconductor manufacturing industry. The filter size is chosen to ensure that the desired abrasives included within the slurry solution, which may be commonly on the order of 50–300 nm in diameter, are not removed from the slurry solution. The filter size is chosen so as to remove larger particles which may be microorganisms, or agglomerated microorganisms. In various exemplary embodiments, 0.1 to 30 micron filter sizes may be used, i.e.—filters capable of removing particles having 0.1 to 30 micron diameters. Filtered slurry stream 11 therefore contains a reduced population of microorganism contaminants which were largely destroyed upon being treated by uv energy, and largely removed from the stream by filter 9. In a preferred embodiment, filtered slurry stream 11 is completely free of microorganism contaminants. Filtered slurry stream 11, therefore, is ready to be delivered to the polishing apparatus. In another exemplary embodiment, the uv treated, filtered slurry stream may be delivered to a secondary storage tank (not shown), such as the slurry day tank as described above.

The uv treated, filtered slurry stream is now ready for use as a polishing slurry within a polishing apparatus, such as a chemical mechanical polishing apparatus. The uv treated, filtered slurry stream may be delivered to the polishing apparatus using any suitable delivery means conventionally available in the art, and within the apparatus will be delivered to the interface between the surface to be polished, and the polishing pad. In an exemplary embodiment, a semiconductor substrate is polished using the uv treated, filtered slurry stream in a common polishing operation such as CMP used in the semiconductor manufacturing industry. It is understood, however, that the uv treated, filtered slurry stream may be provided to any of various polishing operations.

The preceding merely illustrates the principals of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principals of the invention and the concepts contributed by the inventors to furthering the art, and are to be construed as being without limitation to such specifically recited examples and conditions. Moreover, all statements herein reciting principals, aspects, and embodiments of the invention, as well as specific examples thereof, are intended to encompass both structural and functional equivalents thereof. Additionally, it is intended that such equivalents include both currently known equivalents such as equivalents developed in the future, i.e., any elements developed that perform the same function, regardless of structure. For example, the method of the present invention may be used to treat a slurry stream having a pH ranging from 2–12. The method of the present invention may also be used to treat slurry streams used in polishing operations other than CMP, and in applications other than in the semiconductor manufacturing industry.

The scope of the present invention, therefore, is not intended to be limited to the exemplary embodiments shown and described herein. Rather, the scope and spirit of the present invention is embodied by the appended claims.

What is claimed:

1. A method for removing contamination from a slurry solution comprising the steps of:
   (a) providing a polishing slurry stream including solid abrasives therein;
   (b) providing a uv radiation source;
   (c) treating said slurry stream with uv radiation effective to kill microorganisms therein from said uv source;
   (d) filtering said uv-treated slurry stream while substantially retaining said solid abrasives within said filtered slurry stream; and
   (e) delivering said filtered slurry stream as an outlet stream.

2. The method as in claim 1 wherein step (e) comprises delivering said filtered slurry stream to a polishing apparatus.

3. A method for polishing a semiconductor substrate comprising the method as in claim 2, wherein said polishing apparatus comprises a chemical mechanical polishing (CMP) apparatus, and further comprising steps:
   (f) providing a semiconductor substrate having a surface to be polished and mounted for polishing within said CMP apparatus; and (g) polishing said surface while delivering said filtered slurry stream to said surface.

4. The method as in claim 1, wherein said step (c) comprises treating with uv radiation having a wavelength of 254 nanometers.

5. The method as in claim 1, wherein said step (c) comprises treating with uv radiation having a wavelength of 185 nanometers.

6. The method as in claim 1, in which said step (a) includes withdrawing a slurry stream from a slurry source, said slurry stream having a pH in a range of 6–8 and including microorganisms therein, and whereby said steps (c) and (d) combine to substantially remove said microorganisms from said slurry stream.

7. The method as in claim 1, in which said step (c) includes treating with uv radiation including a dosage level of at least 10,000 $\mu$W-s/cm$^2$.

8. The method as in claim 1, in which step (d) includes filtering with a filter capable of removing particles having a diameter ranging from 0.1$\mu$ to 30$\mu$.

9. The method as in claim 1, in which step (c) includes providing a uv treatment chamber and wherein said slurry stream flows through said uv treatment chamber while being treated with said uv radiation.

10. The method as in claim 1, in which step (b) includes providing a mercury discharge lamp as a uv radiation source.

11. The method as in claim 1, in which said step (a) includes withdrawing a first slurry stream from a slurry source and mixing said first slurry stream with a further component, thereby providing said slurry stream.

12. The method as in claim 1, in which said step (a) includes withdrawing a first slurry stream from a slurry source and diluting said first slurry stream by adding water, thereby providing said slurry stream.

13. The method as in claim 1, in which said step (a) includes withdrawing one of an acidic and a basic slurry stream from a slurry source.

14. The method as in claim 1, wherein said step (a) comprises providing a slurry stream which includes recirculated slurry.

15. The method as in claim 2, in which said step (a) includes withdrawing a slurry stream from a slurry source and wherein said polishing apparatus comprises a chemical mechanical polishing apparatus.

16. The method as in claim 1, in which said step (a) includes said solid abrasives having diameters ranging from 50 nanometers to 300 nanometers.

17. The method as in claim 1, in which said step (a) includes said solid abrasives constituting 20% to 30% of said polishing slurry stream.

18. The method as in claim 1, in which said step (a) includes said solid abrasives being formed of silica colloidal solids.

19. A method for removing contamination from a slurry solution comprising the steps of:
(a) providing a polishing slurry stream having a pH in the range of 6–8 and including solid abrasives and microorganisms therein;
(b) providing a uv radiation source and a uv treatment chamber;
(c) treating said slurry stream with uv radiation from said uv source, said uv radiation having a wavelength of about 254 nanometers and a dosage level of at least 10,000 $\mu$W-s/cm$^2$ and said slurry stream flowing through said uv treatment while being treated with said uv radiation;
(d) filtering said uv-filtered slurry stream while substantially retaining said solid abrasives within said filtered slurry stream; and
(e) delivering said filtered slurry stream to a polshing apparatus.

* * * * *